United States Patent
Cotton et al.

(10) Patent No.: US 9,258,468 B2
(45) Date of Patent: Feb. 9, 2016

(54) METHOD AND APPARATUS FOR SEPARATE SPECTRAL IMAGING AND SENSING

(71) Applicant: FluxData, Inc., Rochester, NY (US)

(72) Inventors: Christopher T. Cotton, Honeoye Falls, NY (US); Lawrence Taplin, Rochester, NY (US); Pano Spiliotis, Rochester, NY (US)

(73) Assignee: FluxData, Inc., Rochester, NY (US)

( * ) Notice: Subject to any disclaimer, the term of this patent is extended or adjusted under 35 U.S.C. 154(b) by 0 days.

(21) Appl. No.: 13/767,631

(22) Filed: Feb. 14, 2013

(65) Prior Publication Data

US 2013/0208146 A1 Aug. 15, 2013

Related U.S. Application Data

(60) Provisional application No. 61/599,053, filed on Feb. 15, 2012.

(51) Int. Cl.
*H04N 5/225* (2006.01)
*G02B 27/14* (2006.01)
*G02B 27/10* (2006.01)

(52) U.S. Cl.
CPC ............ *H04N 5/2254* (2013.01); *G02B 27/141* (2013.01); *G02B 27/1066* (2013.01)

(58) Field of Classification Search
None
See application file for complete search history.

(56) References Cited

U.S. PATENT DOCUMENTS

| | | | |
|---|---|---|---|
| 4,806,750 A | | 2/1989 | Vincent |
| 5,459,611 A | * | 10/1995 | Bohn ................. G02B 6/29362 359/618 |
| 5,621,460 A | | 4/1997 | Hatlestad et al. |
| 5,877,866 A | * | 3/1999 | Noguchi ............ G02B 27/1013 348/E9.027 |
| 5,920,347 A | * | 7/1999 | Aoki .................. G02B 27/1013 348/339 |
| 5,982,497 A | * | 11/1999 | Hopkins ........................ 356/419 |
| 6,542,193 B1 | * | 4/2003 | Yoshikawa et al. ........... 348/338 |
| 2001/0021018 A1 | * | 9/2001 | Basiji ..................... G01J 3/2803 356/326 |
| 2005/0200847 A1 | * | 9/2005 | Chen et al. ..................... 356/419 |
| 2009/0251783 A1 | * | 10/2009 | Huibers ............... G02B 27/148 359/583 |
| 2011/0074992 A1 | * | 3/2011 | Ajito et al. ..................... 348/279 |
| 2011/0176048 A1 | * | 7/2011 | Rockley ........................ 348/340 |
| 2011/0228099 A1 | * | 9/2011 | Rakes ........................... 348/169 |
| 2012/0001083 A1 | * | 1/2012 | Knapp ..................... G01J 3/02 250/370.12 |
| 2012/0113276 A1 | * | 5/2012 | Van Arendonk et al. ........................ 348/207.99 |
| 2013/0041221 A1 | * | 2/2013 | McDowall et al. ........... 600/111 |
| 2013/0070125 A1 | * | 3/2013 | Albu ............................. 348/241 |

* cited by examiner

*Primary Examiner* — Twyler Haskins
*Assistant Examiner* — Wesley J Chiu
(74) *Attorney, Agent, or Firm* — John M. Hammond; Patent Innovations LLC

(57) ABSTRACT

An optical device that creates separate images for different wavelength bands of light. The device comprises a light sensor, a first dichroic filter, and a first mirror. The light sensor comprises a first light sensing portion and a second light sensing portion. The first dichroic filter reflects a first portion of incident light of a first wavelength band from a source through an imaging lens with the imaging lens projecting a first image of the source onto the first light sensing portion of the light sensor; and the first dichroic filter transmits a second portion of incident light of a second wavelength band from the scene different from the first wavelength range. The first mirror is positioned to reflect the transmitted second portion of incident light through the imaging lens, the imaging lens projecting a second image of the source onto the second light sensing portion of the light sensor.

20 Claims, 7 Drawing Sheets

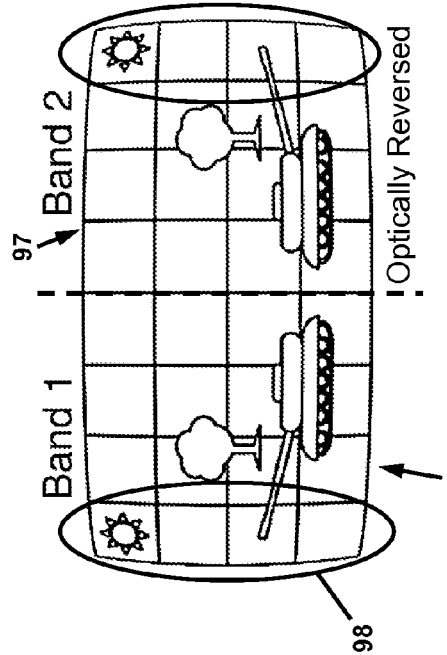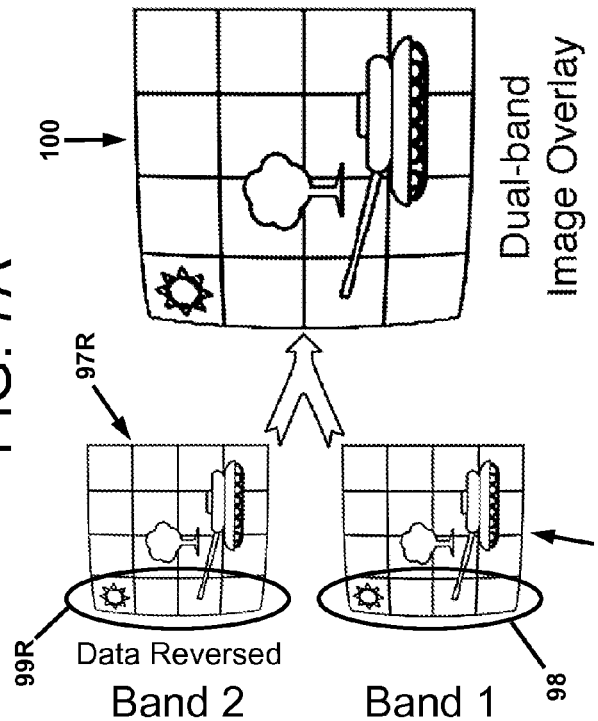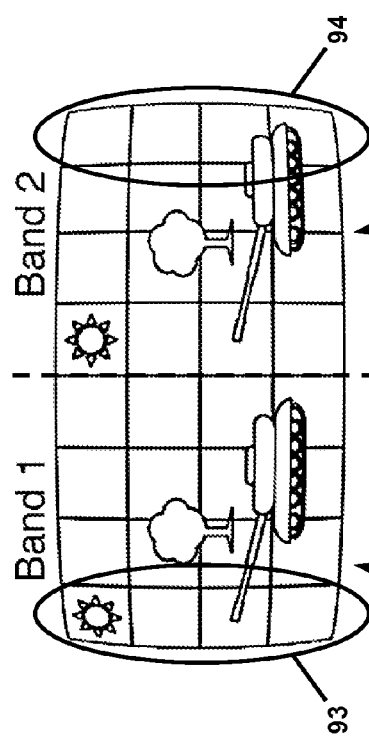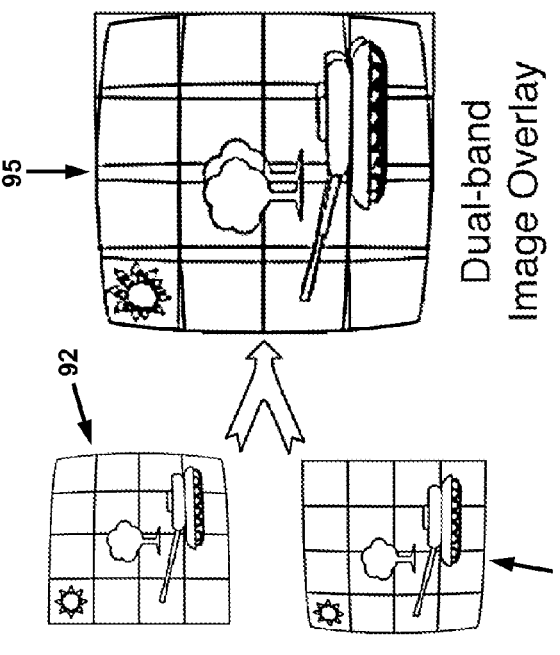

METHOD AND APPARATUS FOR SEPARATE SPECTRAL IMAGING AND SENSING

CROSS-REFERENCE TO RELATED PATENT APPLICATIONS

This application claims priority from U.S. Provisional Patent Application No. 61/599,053 filed Feb. 15, 2012, the disclosure of which is incorporated herein by reference.

BACKGROUND

1. Technical Field

Optical spectrum separation systems used in creating separate images from different wavelength bands of light; and methods for distinguishing different sources of illumination based on differences in the optical spectrum.

2. Description of Related Art

In many fields it is desirable to identify the potential sources of different types of visible or invisible illumination captured by an imaging system, such as by a digital camera. An example is differentiating between "muzzle flash" from a weapon and bright reflections caused by sunlight. Often the spectral signature of two events will be quite different, for example at infrared wavelengths. Therefore, one way to differentiate potential sources of illumination is to separately image different portions of the spectrum and then compare the two images.

One method to separate incoming illumination into separate spectral components is to use dichroic beam splitters. For example, U.S. Pat. No. 4,806,750, the disclosure of which is incorporated herein by reference, discloses a trichromatic beamsplitter comprising composited dichroic beamsplitter plates that separate a projected image into its three color components with spatial as well as spectral precision. The three colors are directed toward a photosensor with three linear arrays. The three linear array photosensor comprises a monolithic sensor having three parallel photodiode arrays spaced precisely to accept the color component images of the trichromatic beamsplitter. Because this invention utilizes linear arrays, and it is intended for use in scanning systems, it is generally not suitable for simultaneously distinguishing transient illumination sources at different spatial locations.

U.S. Pat. No. 5,920,347, the disclosure of which is incorporated herein by reference, describes an optical color separation system that includes a plurality of dichroic mirrors that are arranged nonparallel to one another and along an optical axis of the incident light to reflect different color components. The dichroic mirrors are disposed at predetermined positions so that the respective color components of the incident light are reflected toward different relay positions corresponding to the respective color components. The optical color separation system also includes a plurality of reflection mirrors corresponding to the dichroic mirrors, provided at the relay positions. The reflection mirrors are disposed at predetermined positions such that the different color components reflected by the dichroic mirrors are reflected by the reflection mirrors in a manner that optical paths of the reflected lights from the respective reflection mirrors are substantially parallel.

An alternative method to create separate spectral images is to first split the incoming light using neutral-density beam splitters, and then to filter the spectrum optically at the focal plane. For example, U.S. Pat. No. 5,621,460, the disclosure of which is incorporated herein by reference, describes an optical system for detecting vegetation using a single image sensor, such as a charge-coupled device (CCD). The system is comprised of optical elements which project separate red and near infrared (NIR) images onto the CCD camera. The camera can supply output signals representative of the two images to a signal processing device that determines the nature of the vegetation that provided the original image. Embodiments are disclosed wherein the imaging sensor utilizes unitary optical splitters to provide wide-angle separate images. A further embodiment includes two separate lens, red and NIR filters, each adjacent to one of the lenses so as to project an image on separate areas of the CCD camera.

The above disclosures and others in the art notwithstanding, there remains a need for an optical spectrum separation system and methods for creating separate images from different wavelength bands of light that is of low complexity, and that is adaptable to two dimensional still or video imaging.

SUMMARY

The present invention meets this need by providing an optical spectrum separation system that creates separate images for different wavelength bands of light at the same imaging plane of an image capture device such as a digital camera. More specifically, there is provided an optical spectrum separation system that separates light into two components, the system comprising a dichroic filter that reflects a first wavelength band of light. Light that is not reflected by the dichroic filter is transmitted through it, where it impinges upon a mirror disposed at a predetermined position not parallel to the dichroic filter. Light reflected from the mirror is of a second wavelength band, which is transmitted back through the dichroic filter at an angle distinct from the reflected first wavelength band. Both wavelength bands pass through a single lens that focuses the two wavelength bands toward different positions on a single focal plane where they are received by a plurality of sensors. The images from the two different wavelength bands that are projected onto different positions on the focal plane are separated by a distance that is approximately proportional to the product of the focal length of the lens and the angular separation between the beams.

Before reaching the focal plane array, the two beams may pass through separate transmission filters that spectrally narrow the respective wavelength bands and/or limit crosstalk if the beams overlap on the focal plane. An alternative embodiment (not shown) utilizes a multi-bandpass filter placed into the optical path at a point before the focal plane to accomplish spectral narrowing and separation without the need for alignment relative to the sensing array.

In certain embodiments, the dichroic filter and mirror may be separate optical elements to enable separate adjustment during assembly and alignment of the system. Alternatively, the dichroic filter and the mirror may be integrally formed on opposite sides of a single prism.

In contrast to prior art spectral separation systems known to the Applicants, which place spectral separation optics after an imaging lens, the Applicants' spectral separation system may be configured such that the incoming light to be imaged is first filtered, and then subsequently separated into different beams and formed into an image using a single lens. Sensing at the focal plane may then be performed by a single focal plane array such as a charge-coupled device (CCD). The Applicants' spectral separation systems are thus advantageous because they are simplified and less expensive than other alternatives.

For applications with wide fields of view that might lead to undesirable dimensions of the required optics, or shifts in spectral wavelength separation due to angular sensitivity of the dichroic coatings, it is preferred to provide the system with additional optical elements placed before the dichroic beam splitter to substantially collimate the input beam.

In a broad aspect of the invention, there is provided an optical device comprising a light sensor, a first dichroic filter, and a first mirror. The light sensor is comprised of a first light sensing portion and a second light sensing portion. The first dichroic filter reflects a first portion of incident light of a first wavelength band from a source through an imaging lens with the imaging lens projecting a first image of the source onto the first light sensing portion of the light sensor; and the first dichroic filter transmits a second portion of incident light of a second wavelength band from the scene different from the first wavelength range. The first mirror is positioned to reflect the transmitted second portion of incident light through the imaging lens, the imaging lens projecting a second image of the source onto the second light sensing portion of the light sensor.

The light sensor may be further comprised of a first transmission filter disposed on the first light sensing portion and transmitting light of a first wavelength range, and a second transmission filter disposed on the second light sensing portion and transmitting light of a second wavelength range different from the first wavelength range. The light sensor may be selected from one of a charged coupled device (CCD), a complementary metal-oxide-semiconductor (CMOS) active pixel sensor, an Indium-Gallium-Arsenide (InGaAs) sensor, an Indium-Antimony (InSb) sensor, a Lead-Selenide (PbSe) sensor, and a position sensing device (PSD).

The optical device may be further comprised of a field stop configured to receive incoming light from the source and transmit the incoming light to the dichroic filter and a band-pass filter disposed between the field stop and the dichroic mirror.

The optical device may be further comprised of a second dichroic filter. In one embodiment, the first mirror may be provided as a second dichroic filter reflecting a first part of the second portion of incident light transmitted by the first dichroic filter through the imaging lens as the second image of the source onto the second light sensing portion of the light sensor, and transmitting a second part of the second portion of incident light transmitted by the first dichroic filter to a second mirror positioned to reflect the transmitted second part of incident light through the imaging lens, with the imaging lens projecting a third image of the source onto a third light sensing portion of the light sensor.

The light sensor may be comprised of an image recording medium. In such an embodiment, the optical device may be further comprised of an image processor containing an algorithm that combines the first image of the source and the second image of the source recorded by the recording medium. The optical device may be further comprised of a second mirror positioned to invert one of the first portion of incident light reflected by the dichroic mirror and the second portion of incident light transmitted by the dichroic mirror. The image processor may contain an algorithm that inverts one of the first image of the source and the second image of the source recorded by the recording medium to produce an inverted image and a non-inverted image. The algorithm may include instructions to combine the inverted image and the non-inverted image. In that manner, high quality registration of the two images is attained.

In accordance with the invention, there are also provided methods of using the Applicants' spectral separation systems. The Applicants' systems may be used to distinguish between different sources of illumination, such as from small-arms fire and sunlight reflections, based on differences in their optical spectra. With spatial separation of the spectral bands at the focal plane and a plurality of sensing means, corresponding spatial locations of each beam can be inspected to determine if spectral illumination was present in one beam that indicates the presence of a particular source type, and confirmed by the lack of spectral illumination from confounding sources in the other beam. For many types of source illumination discrimination with array type image sensors, this can be can be accomplished by simply subtracting the sensed signal from the different regions of the focal plane and inspecting the magnitude of the result.

More specifically, there is provided a method of processing two separate images of a scene. The method comprises reflecting a first portion of light of a first wavelength band from an optical element and transmitting a second portion of light of a second wavelength band through the optical element; focusing the reflected first portion of light onto a first portion of an image sensor and obtaining first image data; reflecting the transmitted second portion of light and focusing the transmitted and reflected second portion of light onto a second portion of an image sensor and obtaining second image data; and processing the first and second image data to produce first and second images of the scene.

The method may further include combining the first and second images of the scene, or subtracting one of the first and second images from the other. The method may further include optically inverting one of the first and second portions of light. Such a method may further include digitally inverting one of the first and second images to produce a digitally inverted image and a non-inverted image. The inverted and non-inverted images may be combined, or one of the images subtracted from the other.

DESCRIPTION OF THE DRAWINGS

The present disclosure will be provided with reference to the following drawings, in which like numerals refer to like elements, and in which:

FIG. 6A is an illustration of a pair of exemplary images resulting from the projection of a scene onto the focal plane array of the field-sharing camera of FIG. 1;

FIG. 6B is an illustration of the overlaying of the pair of exemplary images of FIG. 6A;

FIG. 7A is an illustration of a pair of exemplary images resulting from the projection of a scene onto the focal plane array of the field-sharing camera of FIG. 5; and FIG. 7B is an illustration of the overlaying of the pair of exemplary images of FIG. 7A.

Figure 1:
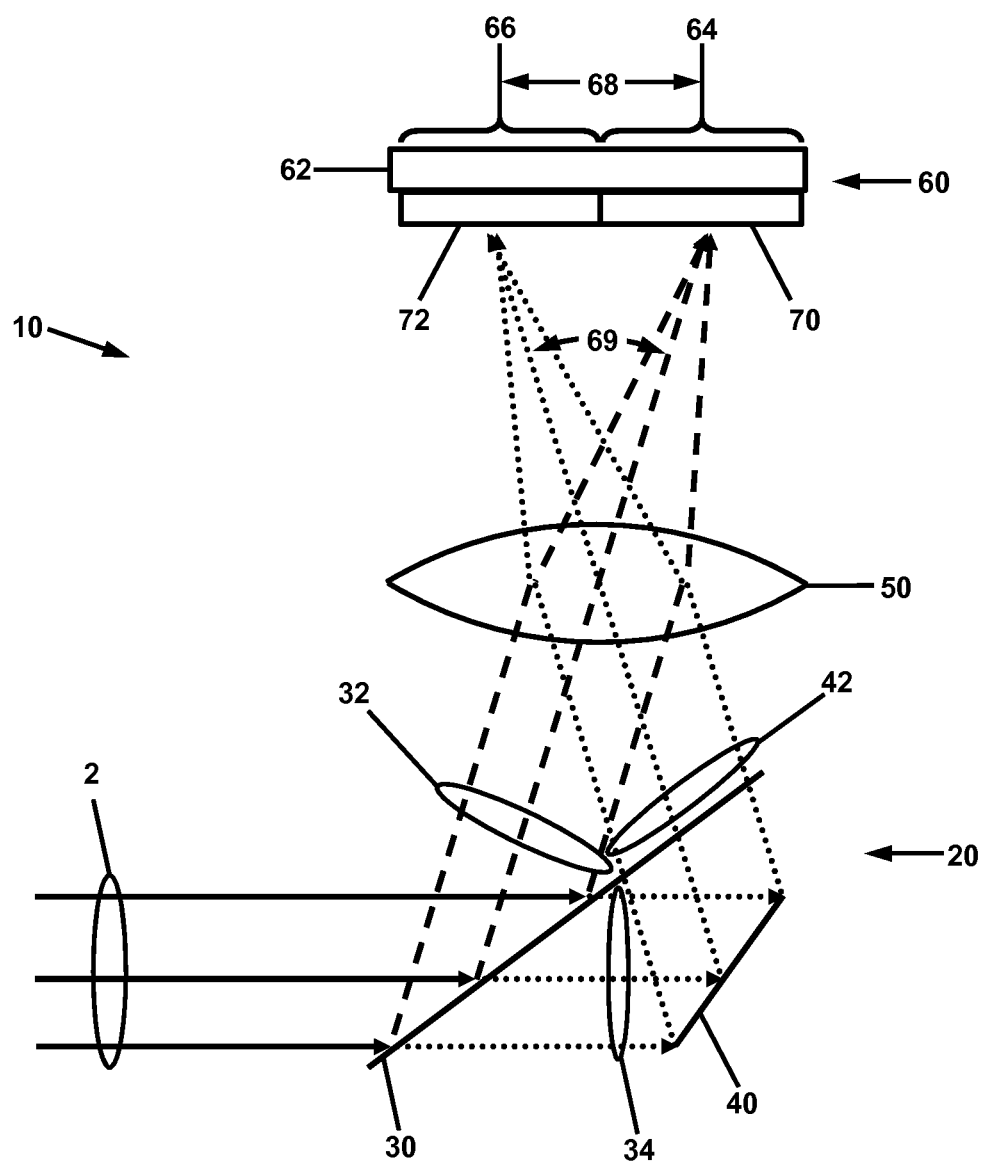
FIG. 1 is a schematic view of a first embodiment of a field-sharing camera comprised of a spectral separation system and a recording medium.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. In the following disclosure, certain components may be described using the adjectives "top," "upper," "bottom," "lower," "left," "right," etc. These adjectives are provided in the context of the orientation of the drawings, which is arbitrary. The description is not to be construed as limiting the Applicants' imaging system to use in a particular spatial orientation. The imaging system may be used in orientations other than those shown and described herein.

As used herein, the term light, as in "light from a source", is meant to include both visible and invisible radiation from the electromagnetic spectrum.

The Applicants' optical spectrum separation and imaging system creates separate images for different wavelength bands of light at the same imaging plane of an image capture device such as a digital camera. Referring first to FIG. 1, a field-sharing camera 10 is shown, comprised of a spectral separation system 20 and a light sensor 60. The light sensor 60 may include or be provided as an image recording medium 60, such as a charge-coupled device (CCD) array. Incoming light 2 from a source to be imaged (not shown) is received by the camera 10. The spectral separation system 20 of the camera 10 is comprised of a single dichroic filter 30 that reflects a first wavelength band of light depicted as rays 32, and transmits a second wavelength band of light depicted as rays 34. The transmitted light 34 impinges upon a mirror 40 disposed at a predetermined position, which is not parallel to the dichroic filter 30. Light reflected from the mirror, shown as rays 42, is of the second wavelength band, which is transmitted back through the dichroic filter 30 at an angle distinct from the angle of the reflected light 32 of the first wavelength band. The light 32 and 42 of the respective wavelength bands passes through a lens 50 that focuses the two wavelength bands toward different positions on a single focal plane sensing array 62. The images that are projected onto the array 62 in areas 64 and 66 are separated by a distance 68 that is approximately proportional to the product of the focal length of the lens 50 and the angular separation 69 between the beams, schematically shown in FIG. 1 for three rays from the center of the system's field of view. Before reaching the focal plane array 62, the two beams may pass through separate transmission filters 70 and 72 that narrow the respective wavelength bands and reduce cross-talk.

In certain embodiments, the dichroic filter 30 and mirror 40 may be separate optical elements to enable separate adjustment during assembly and alignment of the system. Alternatively, the dichroic filter 30 and the mirror 40 may be integrally formed on opposite sides of a single prism. Additionally, it is to be understood that the single lens 50 may be made up of multiple lens elements, or be formed instead from reflective optical elements.

In certain embodiments, the device or camera 10 may include at least one optical filter (not shown) that is placed between the source and the dichroic filter 30, thereby spectrally narrowing at least one range of the light from the source. Alternatively or additionally, at least one optical filter may be placed between the dichroic filter 30 and the imaging lens 50.

In certain embodiments, the imaging lens 50 may be a compound lens comprised of at least one transmissive or reflective optical element. The first mirror 40 may be nonplanar and configured to alter the focus of the beam 42 reflected therefrom. At least one optical element of the device 10 may be configured to selectively alter the path length or focus of the beam of portions of the focal plane of the light sensor 60. The device 10 may be further comprised of means for mechanically interchanging one or more of the filters thereof.

Figure 2:
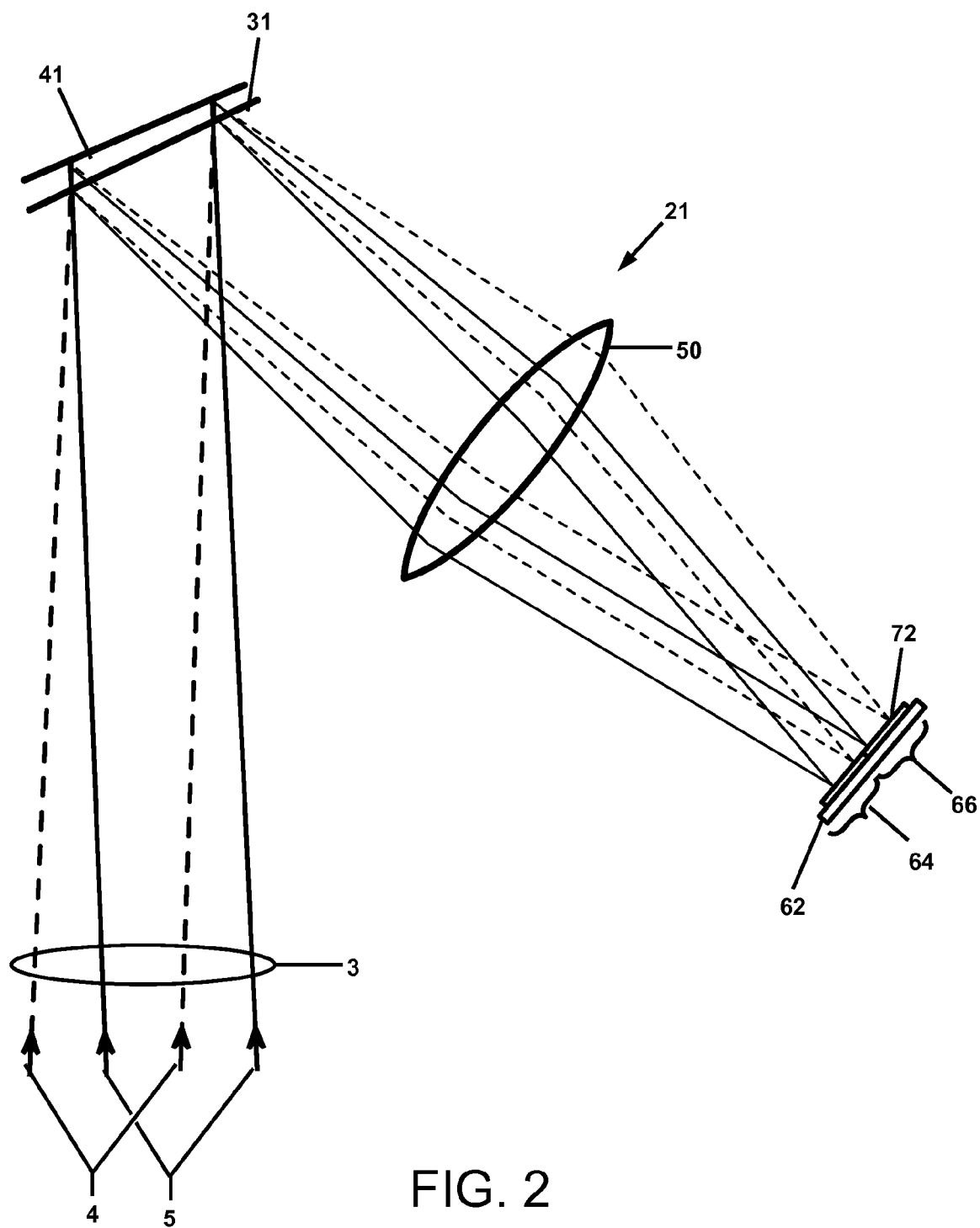
FIG. 2 is an enlarged view of the dichroic filter and mirror of one embodiment of the spectral separation system tracing light rays originating from the edges of the system's field of view.

FIG. 2 is an enlarged view of the dichroic filter and mirror of another embodiment of a spectral separation system showing the path of rays from the right and left sides of the system's field of view. In the spectral separation system 21 shown therein, the dichroic filter 31 and mirror 41 are receiving incoming light 3 from the left side of the field of view (FOV) 5 and right side of the FOV 4, and reflecting it towards an imaging lens 50. Because of the angular disparity of the beams, the imaging forming lens 50 forms two spatially separated images on the focal plane 62.

Figure 3:
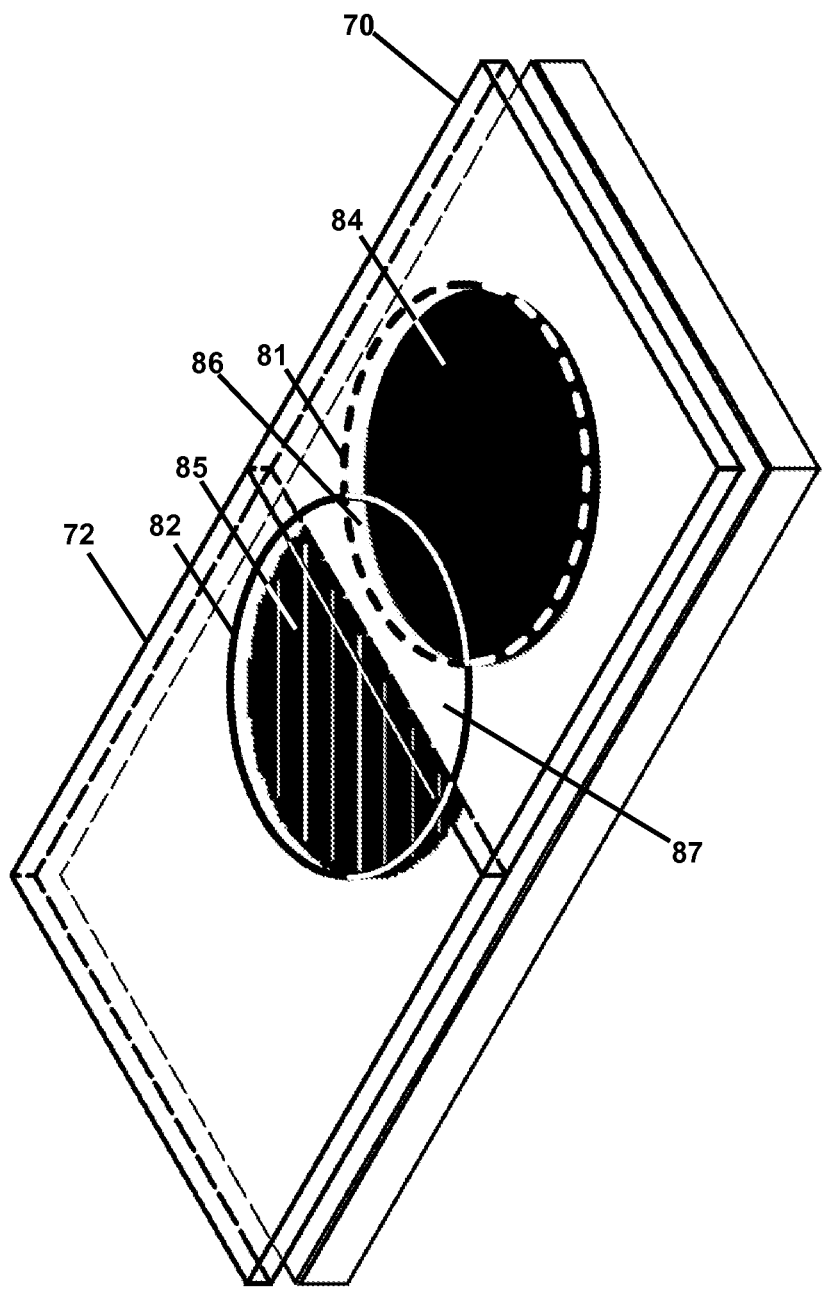
FIG. 3 is an enlarged perspective view of a recording medium comprised of a focal plane array and two adjacent transmission filters, showing cross talk being minimized between the separated images.

FIG. 3 is an enlarged perspective view of a recording medium comprised of a focal plane array and two adjacent transmission filters. Separate regions of the focal plane array 62 are covered by the two filters 70 and 72 that narrow the respective wavelength bands for the two focused images from the two beams 81 and 82. In regions 86 and 87 where a focused image beam falls on a filter designed only to pass light from the other beam, it is prevented from reaching the focal plane, thus forming discrete regions 84 and 85 on the focal plane array 62 where light from only a single beam is sensed. Comparison of the sensed response from corresponding locations in the spectrally separated images allows discrimination based on those spectral differences to be made spatially.

In other embodiments, all or a section of the image recording medium 60 may be covered by a patterned filter array (not shown) instead of or in addition to filters 70 and 72. The patterned filter array may be a Bayer filter having RGB color filters arrayed in a grid or a microgrid polarizer array.

Figure 4:
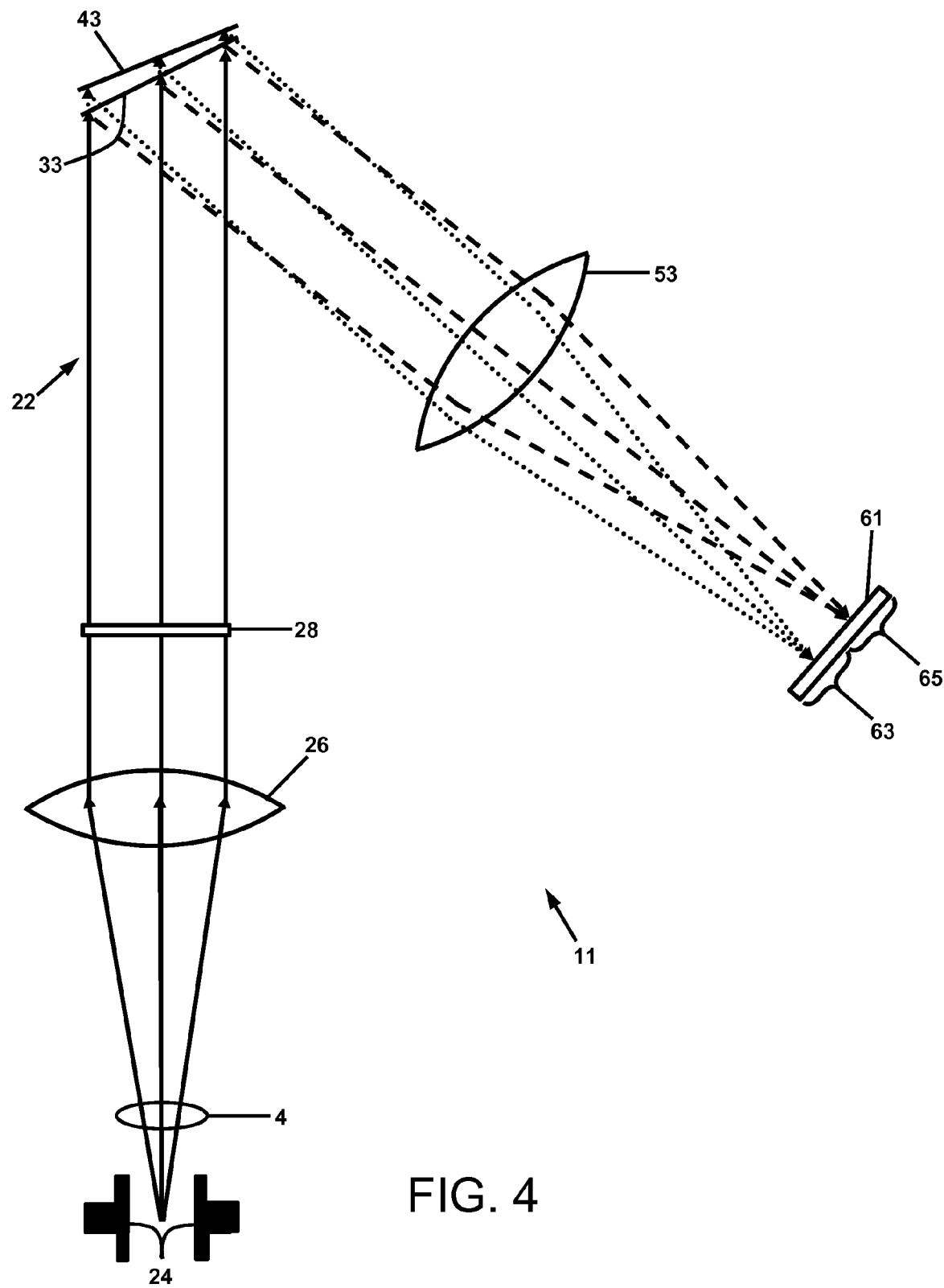
FIG. 4 is a schematic view of a second embodiment of a field-sharing camera including spectral separation system and a recording medium.

FIG. 4 is a schematic view of a second embodiment of a field-sharing camera including a spectral separation system and a recording medium. The spectral separation system 22 is similar in some respects to system 20 of FIG. 1. The system 22 includes a dichroic filter 33 and mirror 43, which separate incoming light into two different wavelengths. The separated light is reflected through lens 53 to adjacent portions 63 and 65 of a recording medium 61. The spectral separation system 22 differs from system 20 of FIG. 1 in that it includes a field stop 24 through which incoming light 4 passes. The incoming light 4 is collimated by lens 26, and then passes through a multi-bandpass filter 28. Because of the field stop 24, the angle of incidence on the multi-bandpass filter 28 is limited, thereby allowing the peak wavelength of the multiple band passes to remain stable across the system's field of view. Also, the multi-bandpass filter 28 eliminates the need for multiple filters to be placed directly in front of the sensor array 61 and the need to align those filters with the sensor array 61. The field stop 24 may be used to create a sharp edge of any shape on the two projected beams images allowing them to be placed in close proximity on the sensing array 61, without causing cross talk between the bands from overlap of the beams.

Figure 5:
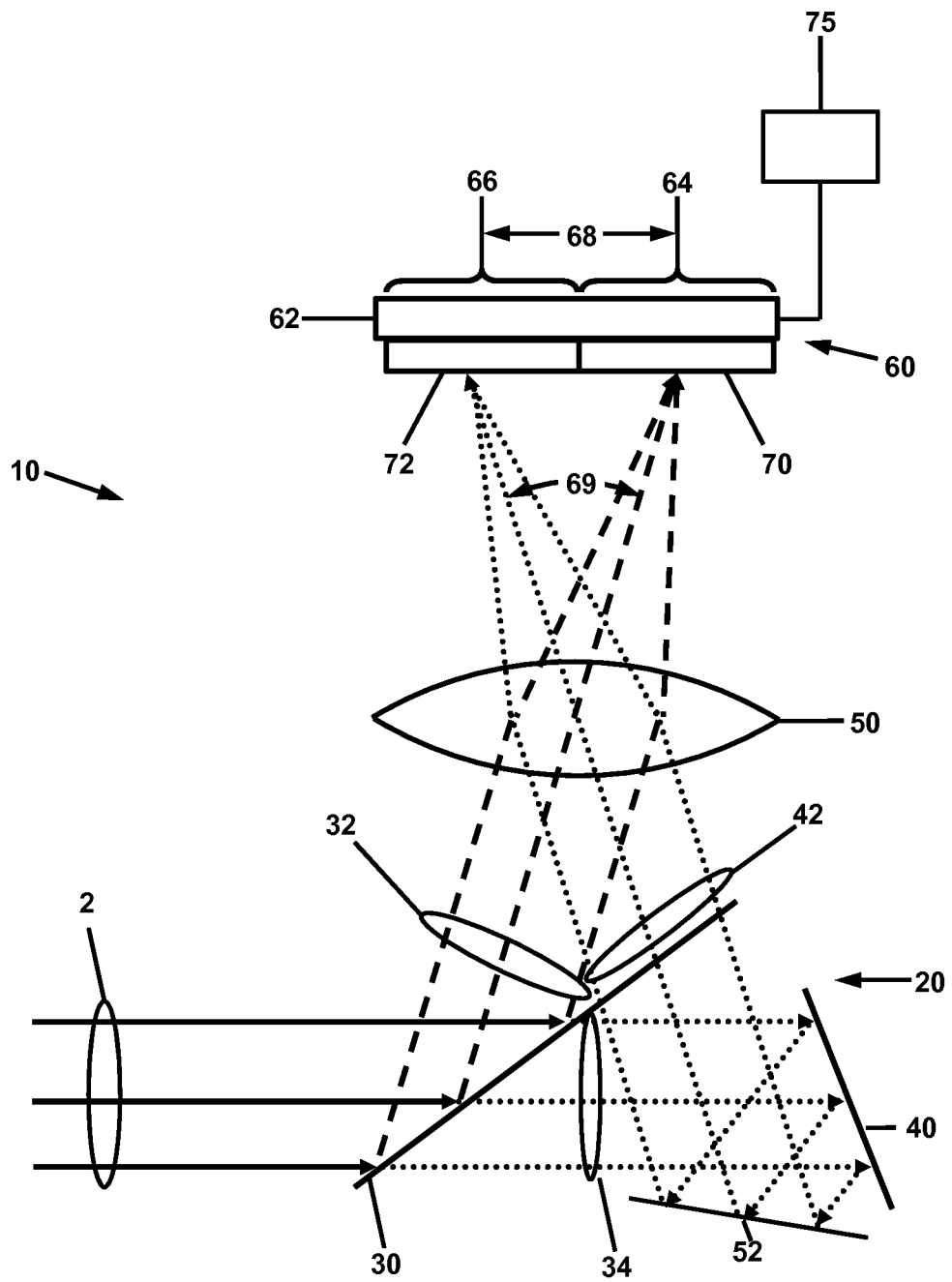
FIG. 5 is a schematic view of a third embodiment of a field-sharing camera including a spectral separation system and a recording medium.

FIG. 5 is a schematic view of a third embodiment of a field-sharing camera including a spectral separation system and a recording medium. The camera 12 is similar to the camera 10 of FIG. 1, but is further comprised of a mirror 52 which inverts the reflected light of one of the wavelength bands. In the embodiment depicted in FIG. 5, the mirror 52 inverts the light 34 before such light is projected on to the transmission filter 72 and focal plane array 62 of the recording medium 60. It will be apparent that the camera 12 could be configured with the mirror 52 located such that the light 32 is inverted instead of light 42. The camera 12 may be further comprised of an image processor 75 for processing images captured by the recording medium 60. The image processor 75 may be provided integrally with the recording medium 60, or separately. Alternatively, the image processor 75 may be separate from the camera 10. The image processor 75 may contain algorithms for digitally inverting images, combining images, and/or subtracting of one image from another image.

The inverting of one of the two separated light bands enables improved image registration when images captured by the recording medium are merged or overlaid by image processor 75. This is best understood with reference to FIGS. 6A-7B.

Referring first to FIG. 6A, an illustration of a pair of exemplary images 91 and 92 resulting from the projection of a scene onto the focal plane array 62 of the field-sharing camera 10 of FIG. 1 is provided. Camera 10 does not have the mirror 52 of the camera 12 of FIG. 5. It can be seen that optical distortion is present in each of the images 91 and 92, the optical distortion occurring at opposed ends of the recording medium 60. Such distortion is indicated by the curvilinear portions of the grid lines in region 93 of image 91 and region 94 of image 92.

Referring to FIG. 6B, it can be seen that when the images 91 and 92 are overlaid by digital image processing, the optical distortion in each image, which is greatest on opposing sides of the respective images, results in poor image registration in composite image 95.

In contrast, FIG. 7A is an illustration of a pair of exemplary images 96 and 97 resulting from the projection of the scene onto the focal plane array 62 of the field-sharing camera 12 of FIG. 5. Camera 12 includes the mirror 52 configured to invert the light that produces image 97, also indicated as "Band 2." By the use of mirror 52 to invert the light 42 of Band 2, the image 97 is optically reversed with respect to image 96.

FIG. 7B is an illustration of the overlaying of images 96 and 97 of FIG. 7A. However, prior to overlaying images 96 and 97, one of the two images is digitally reversed. In FIG. 7B, image 97 is reversed to produce image 97R. The images 96 and 97R are then overlaid into composite image 100. Advantageously, image registration is greatly improved. By inverting the light 42 of Band 2, the optical distortion is caused to affect the same area 99 of image 97 as is affected in area 98 of image 96. Then when one of the two images is digitally inverted, the areas 98 and 99R that contain optical distortion are matched, thus resulting in improved image registration.

It is to be understood that although the spectral separation systems 20, 21, and 22 are drawn with the elements thereof disposed in a single plane, this is done only for simplicity of illustration. The various elements of systems 20, 21, and 22 may be folded or otherwise configured in three dimensional space.

Figure 8:
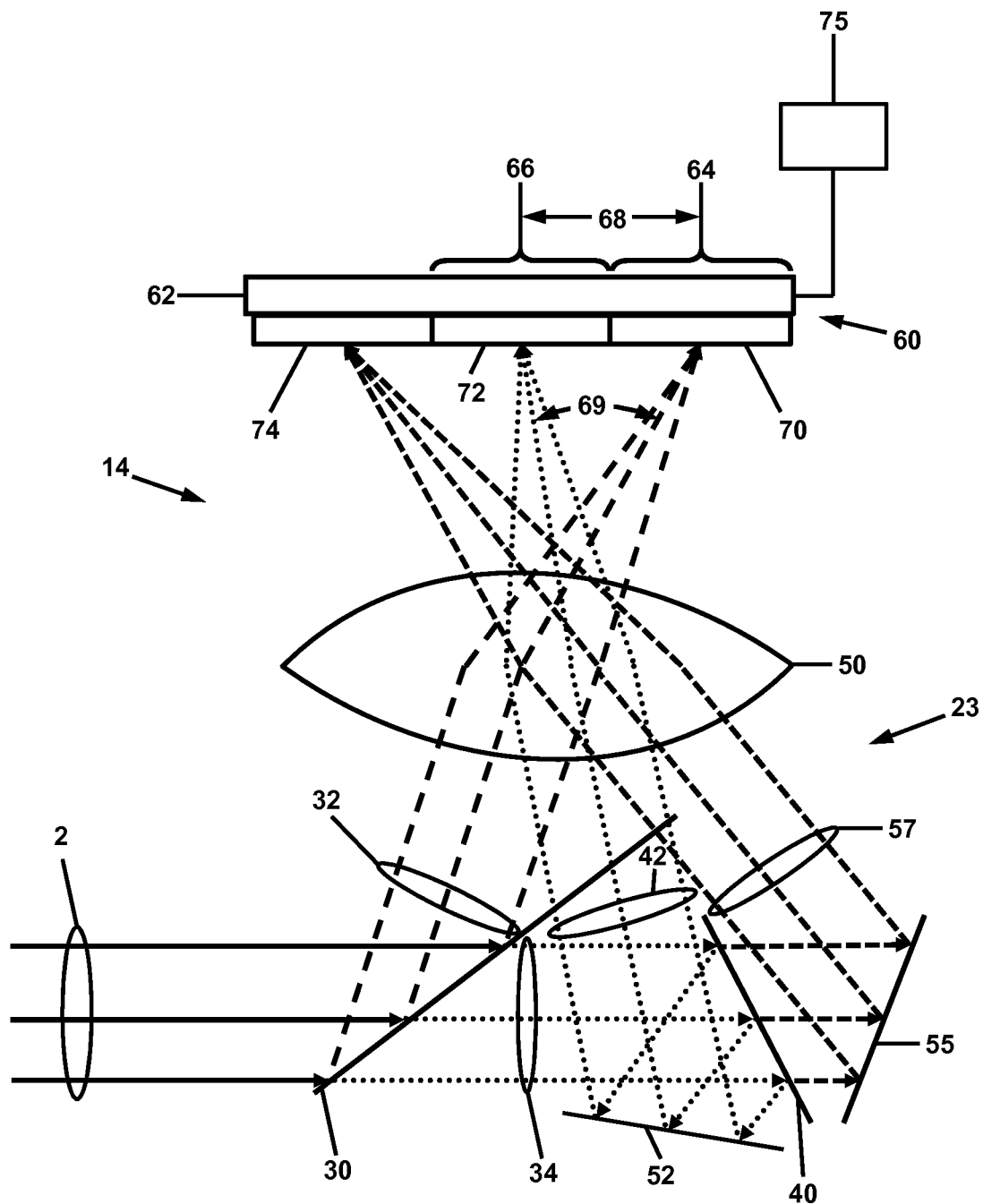
FIG. 8 is a schematic view of a fourth embodiment of a field-sharing camera including a spectral separation system and a recording medium.

It is also to be understood that the Applicants' spectral separation system is not limited to separating incoming light to be imaged into only two separate wavelength bands. In other embodiments, the incoming light may be separated into three wavelength bands, four wavelength bands, or more bands. In general, the spectrum of the incoming light may be separated into N wavelength bands by using N−1 dichroic filters arranged in an optical series at non parallel orientations. Each filter is configured to reflect a different wavelength band at a different angle, thereby enabling propagation of separate beams having different wavelength bands to an image recording medium. FIG. 8 is a schematic view of a camera 14 that includes an embodiment of such a spectral separation system 23, which separates incoming light into three wavelength bands. The camera 14 is similar to the camera 12 of FIG. 5, but mirror 40 is a second dichroic filter reflecting a first part of the second portion 34 of incident light transmitted by the first dichroic filter 30 through the imaging lens 50 as the second image of the source onto the second light sensing portion 72 of the light sensor 60. Additionally, mirror 40 transmits a second part of the second portion 34 of incident light transmitted by the first dichroic filter 30 to a third mirror 55 positioned to reflect the transmitted second part 57 of incident light through the imaging lens 50. The imaging lens 50 projects a third image of the source onto a third light sensing portion 74 of the light sensor 60.

In accordance with the invention, there are also provided methods of using the Applicants' spectral separation systems. The Applicants' systems may be used to distinguish between different sources of illumination. This capability is useful, for example, in applications in which incoming light to be imaged includes spectral content from reflected sunlight, and spectral content from light resulting from small-arms fire and/or ballistic weapons and/or explosive devices. Because the wavelengths of reflected sunlight differ from that of light emitted from discharged weapons, or explosive or incendiary devices, the respective wavelengths can be separated to produce at least two separate images using the Applicants' spectral separation systems as described previously herein. One band may be used to search for spectral illumination wavelengths that differentiate the source of interest from background sources of illumination, and the second band may be used to reduce false positive identification by tuning it to a spectral band also shared with the most likely false positive sources. By subtracting the array-sensed second signal from the array-sensed first signal, detection or classification accuracy can be increased. Additionally, by optically inverting one band of light projected onto an image recording medium, and then digitally inverting the image obtained from that band of light before further processing the images from the first and second bands, detection or classification accuracy can be even further increased.

One advantage of the Applicants' spectral separation systems is that with both images focused onto a single focal plane array with spatial distortion differences minimized by the optical design, the need to synchronize or de-warp frames between two detector arrays when performing comparison computations is eliminated. This enables real time frame-by-frame image analysis and comparison through simple arithmetic operations. If the spectral, spatial and temporal signatures of various weapons are known, it can be determined in a time series of recorded images what weapons were discharged or detonated and where.

It is, therefore, apparent that there has been provided, in accordance with the present invention, optical spectrum separation systems and methods for their use. The systems may be used to create separate images from different wavelength bands of light. The mirrors and lenses of the systems separate incoming light into at least two spectral ranges and image those separate beams to different areas on a single focal plane array. The number of mirrors and lenses is minimized; thus compared to alternative systems, the instant systems are simplified and inexpensive.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. An optical device comprising:
   a) a light sensor comprising a first light sensing portion and a second light sensing portion;
   b) a first dichroic filter comprising a surface reflecting a first portion of incident light of a first wavelength band from a source along a first beam path through an imaging lens, and transmitting a second portion of incident light of a second wavelength band different from the first wavelength band from the source, the imaging lens projecting a first image of the source onto the first light sensing portion of the light sensor;
   c) a first mirror positioned nonparallel to the surface of the first dichroic filter and positioned to reflect the transmitted second portion of incident light along a second beam path through the imaging lens, the imaging lens projecting a second image of the source onto the second light sensing portion of the light sensor, and the second beam path intersecting the first beam path before passing through the imaging lens;
   d) a second mirror positioned to reflect and optically invert only one of the first portion of incident light reflected by the dichroic filter and the second portion of incident light transmitted by the dichroic filter, thereby causing only one of the first portion of incident light and the second portion of incident light to be incident on the light sensor in an inverted state, and the other of the first portion of incident light and the second portion of incident light to be incident on the light sensor in a non-inverted state; and
   e) an image processor in communication with the light sensor and receiving first image data from the first light sensing portion and second image data from the second light sensing portion, the image processor containing an algorithm to process the first image data into a first digital image of the source and the second image data into a second digital image of the source that is inverted with respect to the first digital image of the source, and to digitally invert one of the first digital image of the source and the second digital image of the source, thereby rendering the first digital image of the source non-inverted with respect to the second digital image of the source.

2. The optical device of claim 1, wherein the light sensor is further comprised of a first transmission filter disposed on the first light sensing portion and transmitting light of a first wavelength range, and a second transmission filter disposed on the second light sensing portion and transmitting light of a second wavelength range different from the first wavelength range.

3. The optical device of claim 1, wherein the light sensor is selected from the group consisting of a charged coupled device, a complementary metal-oxide-semiconductor active pixel sensor, an InGaAs sensor, a InSb sensor, a PbSe sensor, and a position sensing device (PSD).

4. The optical device of claim 1, further comprising a field stop configured to receive incoming light from the source and transmit the incoming light to the dichroic filter.

5. The optical device of claim 4, further comprising a bandpass filter disposed between the field stop and the dichroic filter.

6. The optical device of claim 1, wherein the first mirror is a second dichroic filter reflecting a first part of the second portion of incident light transmitted by the first dichroic filter through the imaging lens as the second image of the source onto the second light sensing portion of the light sensor, and transmitting a second part of the second portion of incident light transmitted by the first dichroic filter to a third mirror positioned to reflect the transmitted second part of incident light through the imaging lens, the imaging lens projecting a third image of the source onto a third light sensing portion of the light sensor.

7. The optical device of claim 1, wherein the algorithm further includes instructions to register the first and second digital images with each other, including matching a first outer lateral region of the first digital image having first optical distortion with a second outer lateral region of the second digital image having a second optical distortion.

8. The optical device of claim 1, wherein at least a section of the light sensor is covered by a patterned filter array.

9. The device of claim 7, wherein the algorithm further includes instructions to combine the first and second registered digital images to produce a third digital image.

10. The device of claim 7, wherein the algorithm further includes instructions to subtract the first registered digital image from the second registered digital image to produce a third digital image.

11. A method of processing first and second images of a scene, the method comprising:
    a) reflecting a first portion of light of a first wavelength band emitted by the scene from an optical element and transmitting a second portion of light emitted by the scene of a second wavelength band through the optical element;
    b) optically inverting one of the first portion of light and the second portion of light with respect to the other of the first portion of light and the second portion of light;
    c) directing the reflected first portion of light along a first beam path and focusing the reflected first portion of light onto a first portion of an image sensor and obtaining first image data;
    d) reflecting the transmitted second portion of light and directing the reflected second portion of light along a second beam path non-parallel to the first beam path and intersecting the first beam path before passing through the imaging lens, and focusing the transmitted and reflected second portion of light onto a second portion of the image sensor and obtaining second image data; and
    e) processing the first and second image data to produce the first and second images of the scene;
    wherein one of the first and second images of the scene is inverted with respect to the other of the first and second images of the scene.

12. The method of claim 11, further comprising digitally inverting one of the first and second images to render the first and second images of the scene non-inverted with respect to each other.

13. The method of claim 12, further comprising overlaying one of the first and second images of the scene on the other of the first and second images of the scene.

14. The method of claim 12, further comprising subtracting one of the first and second images of the scene from the other of the first and second images of the scene.

15. The method of claim 13, wherein the first image of the scene includes a first outer lateral region having first optical distortion, and the second image of the scene includes a second outer lateral region having second optical distortion, and the method further comprises registering the first and second images with each other, including matching the first outer lateral region of the first image having the first optical distortion with the second outer lateral region of the second image having the second optical distortion.

16. The method of claim 15, further comprising combining the first and second registered images to produce a third image.

17. The method of claim 15, further comprising subtracting the first registered image from the second registered image to produce a third image.

18. A method of processing first and second images of a scene, the method comprising:
   a) reflecting a first portion of light of a first wavelength band emitted by the scene from an optical element and transmitting a second portion of light of a second wavelength band emitted by the scene through the optical element;
   b) optically inverting one of the first portion of light and the second portion of light with respect to the other of the first portion of light and the second portion of light;
   c) directing the reflected first portion of light along a first beam path and focusing the reflected first portion of light onto a first portion of an image sensor and obtaining first image data;
   d) reflecting the transmitted second portion of light and directing the reflected second portion of light along a second beam path non-parallel to the first beam path and intersecting the first beam path before passing through the imaging lens, and focusing the transmitted and reflected second portion of light onto a second portion of the image sensor and obtaining second image data;
   e) processing the first and second image data to produce first and second images of the scene, wherein one of the first and second images of the scene is inverted with respect to the other of the first and second images of the scene; and
   f) digitally inverting one of the first and second images to render the first and second images of the scene non-inverted with respect to each other.

19. The method of claim 18, wherein the first wavelength band is from light emitted by a first light source illuminating the scene, and the second wavelength band is from light emitted by a second light source illuminating the scene.

20. The method of claim 19, wherein the first light source is sunlight, and the second light source is from one of a small-arms discharge, a ballistic weapon, or an explosive device.

* * * * *